United States Patent [19]

Roberts et al.

[11] Patent Number: 4,737,643
[45] Date of Patent: Apr. 12, 1988

[54] POLARIZATION ANALYZER FOR HIGH ENERGY PULSED LASER BEAMS

[75] Inventors: Thomas G. Roberts; William F. Otto; William L. Gamble, all of Huntsville; Thomas E. Honeycutt, Somerville, all of Ala.

[73] Assignee: The United States of America as represented by the Secretary of the Army, Washington, D.C.

[21] Appl. No.: 814,447

[22] Filed: Dec. 30, 1985

[51] Int. Cl.⁴ .......................................... G01K 17/20
[52] U.S. Cl. ................................. 350/336.1; 374/32
[58] Field of Search ............... 250/336.1, 349; 374/32

[56] References Cited

U.S. PATENT DOCUMENTS 4,301,680 11/1981 Lunev et al. ........................ 374/32

FOREIGN PATENT DOCUMENTS 0460452 2/1975 U.S.S.R. ............................ 374/32

OTHER PUBLICATIONS

Kuz'michev et al " . . . Meter for Measuring the Power of $CO_2$ Laser Radiation" *Sov. J. Quant. Electron* vol. 4, No. 11, May 75.

*Primary Examiner*—Janice A. Howell
*Assistant Examiner*—Richard E. Hanig
*Attorney, Agent, or Firm*—Freddie M. Bush; Robert C. Sims

[57] ABSTRACT

A wire resistor is mounted so that its position may be rotated continuously. The resistance of the wire (when subjected to the high energy laser beam) is measured as a function of position by use of a bridge circuit for determining the resistance and a potentiometer for determining the position. This device may also be used to analyze moderate power (greater than 1 watt) cw laser beams but here it is necessary to chop the beam in order to obtain the data.

8 Claims, 1 Drawing Sheet

POLARIZATION ANALYZER FOR HIGH ENERGY PULSED LASER BEAMS

DEDICATORY CLAUSE

The invention described herein may be manufactured, used, and licensed by or for the Government for governmental purposes without the payment to us of any royalties thereon.

BACKGROUND OF THE INVENTION

Polarizers and polarization analyzers are very useful and are available in several forms for most laser beams even in the infrared portion of the electromagnetic spectrum where wire grid polarizers are used with low to moderate power $CO_2$ lasers and other lasers. However, for high energy pulsed lasers there are no polarization analyzers. Therefore, it is an objective of this disclosure to provide a device that can be used with high energy pulsed lasers to obtain information about their polarization properties.

A recent teaching by Pyles, et al in application No. 707,294, filed Mar. 1, 1985 now abandoned has made it possible to sample a high energy pulsed laser beam in a nonobstructing manner. Recent test of their power meter on the output of a relatively low power linearly polarized cw laser beam has shown the output to be somewhat sensitive to the direction of polarization relative to the direction of the wires. The output is 50% larger when wires are aligned perpendicular to the direction of polarization as compared to the output when the wires are aligned parallel to the direction of polarization. This result is just the opposite to what one would expect based on the manner in which wire grid polarizers work. However, the spacing between the wires and the diameters of the wires are such that this device would be expected to have very little, if any, similarity to wire grid polarizers. But the observed results are consistent with the manner in which mirrors behave with respect to linearly polarized light. That is, if it is assumed that the very small part of the energy in the laser beam which is blocked by the wires is reflected or scattered from the wires as if they were mirrors then one would expect maximum absorption for the direction of polarization perpendicular to this direction. The results of the above experiments are consistent with this assumption.

SUMMARY OF THE INVENTION

The polarization analyzer for high energy pulsed laser beams consists of a wire resistor mounted so that its position may be rotated continuously. The resistance of the wire is measured as a function of position by use of a bridge circuit for determining the resistance and a potentiometer for determining the position. This device may also be used to analyze moderate power (greater than 1 watt) cw laser beams but here it is necessary to chop the beam in order to obtain the data.

DESCRIPTION OF THE BEST MODE AND PREFERRED EMBODIMENT

Figure 1:
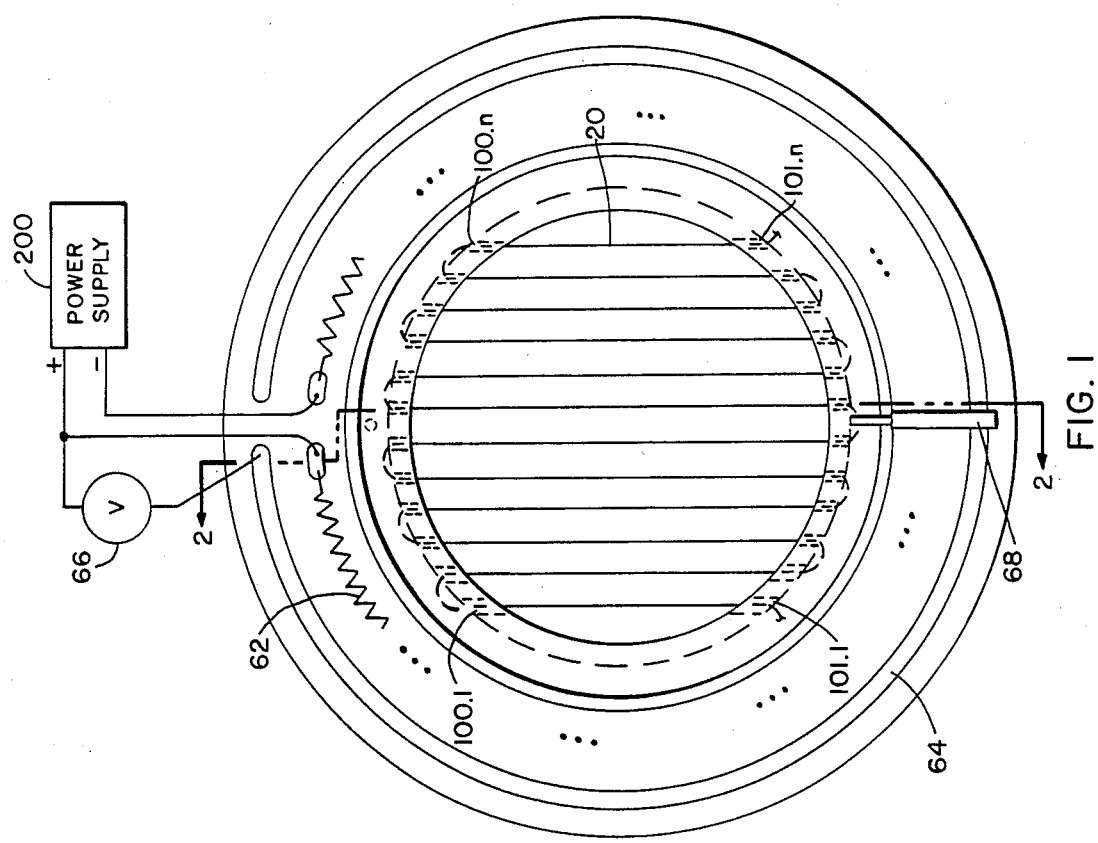
FIG. 1 is a schematic illustration of front view of the polarization analyzer.
Figure 2:
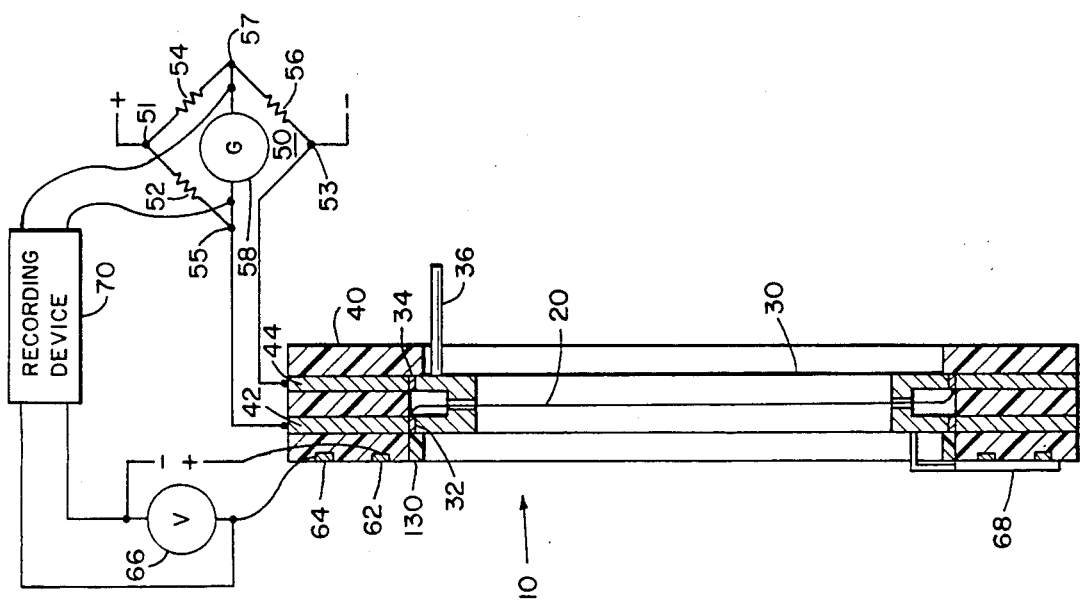
FIG. 2 is a schematic illustration of section A-A of FIG. 1.

Referring to the drawings the polarization analyzer for high energy (in excess of 50 watts average power) pulsed laser beams 10 consists of a wire resistor 20 strung or wound as shown on a thin spool 30. Holes 100.1–100.n and 101.1–101.n are drilled in spool 30 for passage of wire 20. The spacing between the wire segments should be much greater than 10 times the wavelength of the laser. Spacings of 0.031 inches and 0.393 inches have been used for a laser wavelength of 10.6 $\mu m$. The spool 30 is made of an insulating material and has affixed to its outside two conducting bands 32 and 34. Bands 32 and 34 may take the shape and function of ring commentators. Each end of the wire 20 is attached to one of the conducting bands 32 and 34 respectively. The wire used for high energy repetitively pulsed lasers is a tungsten wire 0.001 inches in diameter. Other wires could be used, for example see the teachings of Pyles et al, U.S. patent application No. 707,294.

The spool 30 rotatably fits into an outer cylinder of raceway 40 a retaining nut 130 thready engages raceway 40 so as to secure spool 30 therein. FIG. 1 is shown without nut 103. The outer cylinder 40 is made of insulating material and to each side is attached conducting bands 42 and 44. These bands are arranged so that bands 32 and 34 slide on them and make electrical contact at all times. Any of the well known brush constructions may be used in place of bands 42 and 44 or brush commentators could be substituted for bands 32 and 34 instead. The wire resistor 20 constitutes one leg of a conventional resistance bridge 50. The other three resistors of the bridge are 52, 54, and 56. Voltage is applied as shown at 51, and 53. The output signal is developed on meter 58 between points 55 and 57 and is recorded or displayed in any convenient manner by recording device 70. The bridge is connected to the resistance wire 20 by contacts to bands 42 and 44. The rotated position of the wire resistor 20 relative to a fixed position (vertical) is measured by the output voltage of a potentiometer. The potentiometer consists of a wire resistor 62 mounted on or made into one face of the outer cylinder 40. A conducting strip 64 is mounted on or made into one face of the outer cylinder 40. A spring-loaded sliding contact 68 is mounted on the spool 30 and makes contact between 62 and 64 and a dc power supply 200. The voltage is read out by meter 66. The output voltage is proportional to the angular position of the wire resistor 20 (and contact 68) relative to top dead center. The spool 30 is rotated by hand using the knob 36 but it could be made to rotate mechanically at a constant rate by standard engineering practices.

In operation the polarization analyzer 10 is placed in the laser beam after bridge 50 has been balanced, and the potentiometer 68 positioned for zero voltage. The spool 30 is rotated and output signals are recorded by recording device 70 as a function of position of the wire 20 in radians or degrees. For unpolarized or circularly polarized light a constant signal is obtained when the analyzer is rotated. For linearly polarized light or elliptically polarized light the DC signal is modulated by a sine wave when the analyzer is rotated. When the depth of modulation is 50% the light is linearly polarized with direction of polarization being given by the phase of the maximum reading. For elliptically polarized light the major axis of the ellipse is given by the phase of the maximum reading, and the direction of the minor axis is given by the phase of the minimum reading. The eccentricity is given by the degree of modulation with the eccentricity being one (1) when the modulation depth is zero and the eccentricity is zero when the modulation depth is approximately 50%.

This device also works for cw lasers when their outputs are of the order of a few watts, say 3 watts or so. Unlike other polarization analyzers, this device is not to be used to polarize the beam. It determines the polarization from a response to a negligible part of the beam which it blocks, and does not affect the polarization of that part of the beam which it passes.

We claim:

1. An analyzer for an energy beam comprising a wire resistor having at least one segment arranged in a straight line, first means for holding said resistor such that the energy beam will impinge on said wire resistor, said first means being rotable so as to align said resistor at different angles relative to said energy beam, and first and second measuring means connected to wire resistor so as to measure resistance of said wire and the angle the wire resistor is positioned.

2. An analyzer as set forth in claim 1 wherein said energy beam is a pulsed laser beam having an output in excess of 50 watts average power.

3. An analyzer as set forth in claim 1 wherein said wire resistor is wound on said first means so as to present a plurality of segments each arranged in a separate straight line, each straight line is parallel to each other straight line and each is located in a single plane.

4. An analyzer as set forth in claim 3 wherein said first means is a hollow spool, and said wire resistor is wound inside the spool.

5. An analyzer as set forth in claim 4 further comprising a raceway device, said spool being located within said raceway, and a plurality of sliding contact means connecting said wire resistor in said spool to said raceway and to said first and second measuring means.

6. An analyzer as set forth in claim 5 wherein said energy beam is a pulsed laser beam having an output in excess of 50 watts average power.

7. A polarization analyzer for an energy laser beam comprising a wire resistor wound such that it presents a plurality of straight line segments each in a single plane and parallel to each other, first means connected to said resistor so as to position said plane such that the laser beam will be substantially perpendicular to said plane and will impringe on at least a portion of said segments so as to cause heating of said resistor in accordance to the average power output of the beam and its polarization position relative to the alignment of said segments, first measurement means connected to said wire resistor for measuring the resistance of said resistor, one raceway means connected to said first means so as to allow rotation of said segments within said plane, second measurement means connected to said first means and said raceway means for measuring the angle of rotation of said segments relative to a predetermined angle position of the segments relative to said raceway, and said first means being rotated so as to allow a plurality of measurements to be made about a plurality of angles of rotation of said segments.

8. An analyzer as set forth in claim 7 wherein said beam has a predetermined wavelength and an output in excess of 50 watts average power and the line segments are spaced apart from each other by a distance greater than ten times said wavelength.

* * * * *